United States Patent
Carr

(10) Patent No.: US 7,359,067 B2
(45) Date of Patent: Apr. 15, 2008

(54) OPTICAL DISPLACEMENT SENSOR COMPRISING A WAVELENGTH-TUNABLE OPTICAL SOURCE

(75) Inventor: Dustin Wade Carr, Albuquerque, NM (US)

(73) Assignee: Symphony Acoustics, Inc., Albuquerque, NM (US)

( * ) Notice: Subject to any disclaimer, the term of this patent is extended or adjusted under 35 U.S.C. 154(b) by 174 days.

(21) Appl. No.: 11/278,990

(22) Filed: Apr. 7, 2006

(65) Prior Publication Data

US 2007/0236704 A1  Oct. 11, 2007

(51) Int. Cl.
  *G01B 9/02* (2006.01)
  *G01L 1/24* (2006.01)
(52) U.S. Cl. ..................... 356/519; 356/35.5
(58) Field of Classification Search ............... 356/35.5, 356/454, 480, 519, 506; 250/227.19, 227.27; 359/578
  See application file for complete search history.

(56) References Cited

U.S. PATENT DOCUMENTS

| | | | |
|---|---|---|---|
| 4,983,824 A | 1/1991 | Saaski et al. | |
| 5,128,537 A | 7/1992 | Halg | |
| 5,589,689 A | 12/1996 | Koskinen | |
| 5,831,262 A | 11/1998 | Greywall et al. | |
| 5,832,157 A | 11/1998 | Berthold et al. | |
| 5,909,280 A | 6/1999 | Zavracky | |
| 5,986,759 A | 11/1999 | DeCain et al. | |
| 6,321,010 B1 | 11/2001 | Walker et al. | |
| 6,483,619 B1 | 11/2002 | Greywall | |
| 6,567,572 B2 | 5/2003 | Degertekin et al. | |
| 7,042,579 B2* | 5/2006 | North Morris | 356/519 |
| 7,164,479 B2* | 1/2007 | Johansen et al. | 356/506 |
| 2003/0038949 A1 | 2/2003 | Degertekin et al. | |
| 2004/0099799 A1 | 5/2004 | Shinzou | |
| 2004/0130728 A1 | 7/2004 | Degertekin et al. | |
| 2005/0018541 A1 | 1/2005 | Johansen et al. | |
| 2005/0105098 A1 | 5/2005 | Johansen et al. | |
| 2005/0231729 A1 | 10/2005 | Lopushansky et al. | |

OTHER PUBLICATIONS

Search Report and Written Opinion; Sep. 18, 2007.
Sagberg, et al., Optical Microphone Based on a Modulated Diffractive Lens, IEEE Photonics Technology Letters, vol. 15, No. 10, Oct. 2003, pp. 1431-1433.

* cited by examiner

*Primary Examiner*—Michael A. Lyons
(74) *Attorney, Agent, or Firm*—DeMont & Breyer LLC

(57) ABSTRACT

An optical displacement sensor is disclosed that provides a optical displacement sensor that includes a optically-resonant cavity tuned to an operating wavelength without some of the disadvantages for doing so in the prior art. An embodiment of the present invention tunes an operating wavelength used with a Fabry-Perot interferometer to develop a desired relationship between the wavelength and the Fabry-Perot interferometer's initial cavity length.

13 Claims, 10 Drawing Sheets

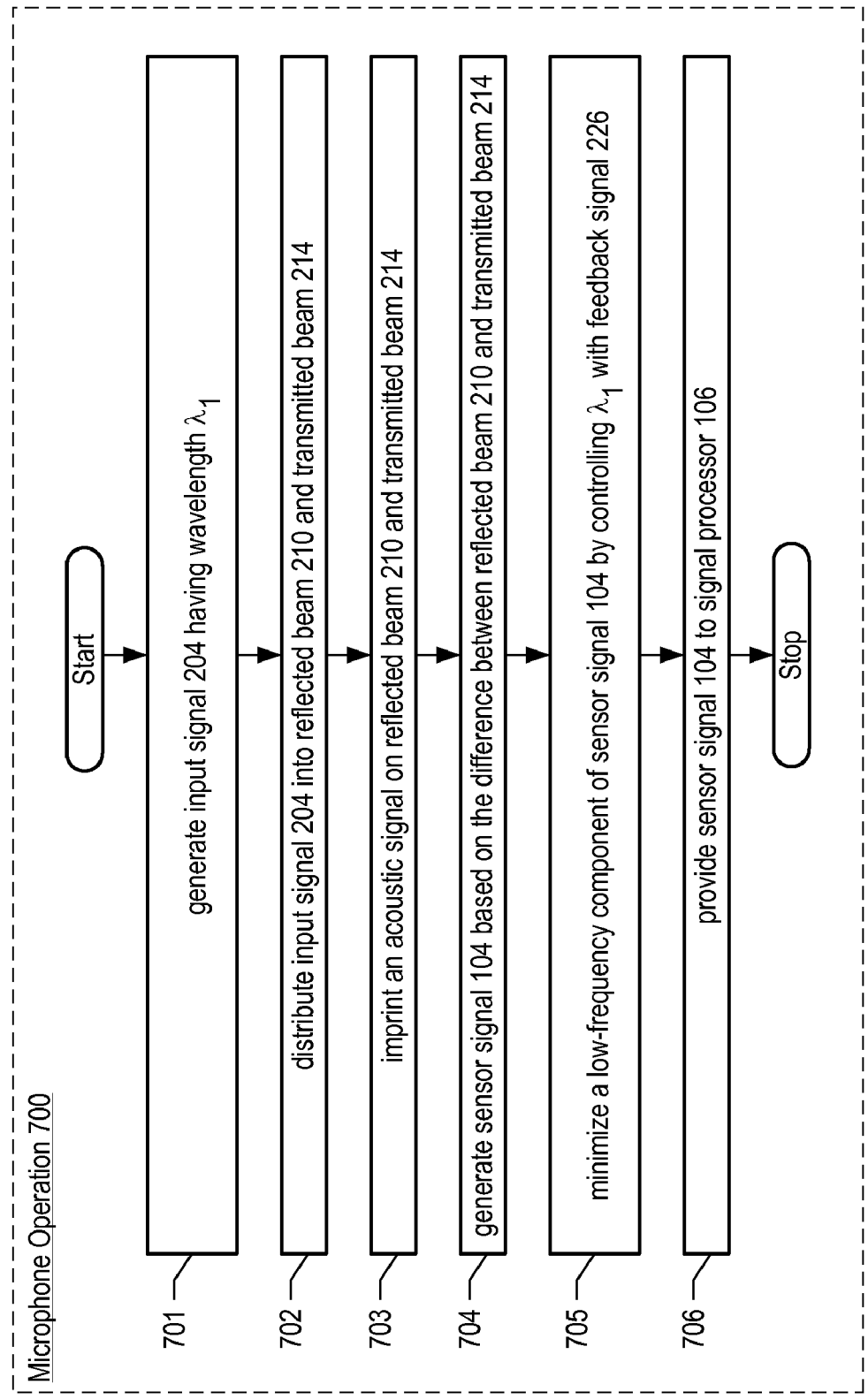

OPTICAL DISPLACEMENT SENSOR COMPRISING A WAVELENGTH-TUNABLE OPTICAL SOURCE

FIELD OF THE INVENTION

The present invention relates to displacement sensors in general, and, more particularly, to microphones.

BACKGROUND OF THE INVENTION

Displacement sensors, such as microphones and pressure sensors, are well-known. Displacement sensors based on capacitive, impedance, and optical measurements have been developed. Optical displacement sensors are particularly attractive as they overcome many of the limitations of capacitive and impedance measurement techniques, such as low sensitivity, the need for high-voltage biasing, poor electrical isolation, or response nonlinearities.

Many optical-displacement sensors known in the prior art operate by detecting light reflected by an optical element that changes its reflectivity in response to an environmental stimulus, such as pressure differential, sound, vibration, etc. The detected light is converted into an electrical signal. This signal is a function of the reflectivity of the optical element, and, therefore, a function of the stimulus as well.

A Fabry-Perot interferometer has served as such an optical element. The reflectivity of a Fabry-Perot interferometer depends on the spacing between its two, substantially-parallel, partially-reflective surfaces and its operating wavelength, $\lambda$, (i.e., the wavelength, $\lambda$, of the light on which the interferometer operates).

The spacing between the partially-reflective surfaces is referred to as the "cavity length" of the Fabry-Perot interferometer. In order to form a Fabry-Perot interferometer that is sensitive to sound, etc., one surface of the Fabry-Perot interferometer is a surface of a movable membrane. When the movable membrane moves in response to incident sound, the cavity length changes and, therefore, so does the reflectivity of the Fabry-Perot interferometer. As a result, the electrical signal based on the detected light is a function of the acoustic energy incident on the Fabry-Perot interferometer.

The relationship between its initial cavity length (i.e., its cavity length in the absence of environmental stimulus), $L_0$, and the operating wavelength has significant impact on the interferometer's performance in many applications. Therefore, prior art Fabry-Perot interferometers are typically designed to have a specific value of $L_0$ (i.e., a "design value"). In practice, fabrication and packaging variations lead to a deviation between the actual and the design value of $L_0$. This deviation generally degrades interferometer sensitivity and signal-to-noise ratio (SNR). It has been necessary in the prior art, therefore, to provide a means for individually tuning the cavity length of each Fabry-Perot interferometer to achieve the proper relationship to wavelength in order to overcome this variation.

In prior-art microphones, $L_0$ is tuned electrostatically. A voltage applied to electrodes that are added to both the deformable membrane and the substrate attracts the deformable membrane toward the substrate, thereby reducing $L_0$. The use of an electrostatic actuator to tune $L_0$ has three main drawbacks: 1) deforming the membrane increases its internal stress, thereby increasing its resonant frequency and affecting interferometer response; 2) a high electric-field is required to generate sufficient force to deflect the membrane; and 3) the addition of an electrostatic actuator complicates the fabrication of the Fabry-Perot interferometer, which increases the cost and complexity of the microphone.

In order to induce an electric field of sufficient strength to tune the membrane, the Fabry-Perot interferometer must either have a short cavity length or a very high voltage (typically about 200-300 V) must be used. The use of a high voltage is undesirable in most applications, since it requires high-power electronics and/or charge pumps. High-power electronics are known to have poor reliability as compared to that of low-power electronics. Also, the quiescent power dissipation of high-power electronics leads to significant power consumption; this is particularly undesirable in applications such as hearing aids and cell phones. Finally, the use of a high-voltage actuator creates a potential safety hazard, which is particularly undesirable in the case of hearing aid microphones.

To avoid high-voltages, prior-art optical microphones have instead relied on a short cavity length to attain sufficient electric field strength. A short cavity length, however, results in undesirable dynamic effects that negatively impact Fabry-Perot interferometer performance, such as the well-known "squeeze-film" effect. The squeeze-film effect arises from the motion of one of two closely-spaced surfaces. It is caused by the compression and decompression of a trapped volume of gas, which is present between the surfaces. This results in generation of "noise pressure," which contributes directly to the noise in the output signal, thereby degrading SNR.

A displacement sensor having high dynamic range and high sensitivity but does not require a Fabry-Perot interferometer whose initial cavity length is mechanically-tunable would, therefore, be a significant advance in the art.

SUMMARY OF THE INVENTION

The present invention enables the optical detection of a pressure differential without some of the costs and disadvantages for doing so in the prior art. For example, embodiments of the present invention are particularly well-suited for use in microphones, high-sensitivity pressure sensors, vibration sensors, and accelerometer applications.

Embodiments of the present invention, like the prior art, use a movable membrane to provide one surface of an optically-resonant cavity that responds to a stimulus, such as a pressure differential or acoustic energy. In the prior art, the initial cavity length of the optically-resonant cavity is physically-adjusted, using an actuator, to "match" an operating wavelength. In contrast to the prior art, the present invention does NOT adjust the initial cavity length to match the operating wavelength but instead adjusts the operating wavelength of the input light to "match" the initial cavity length.

Embodiments of the present invention derive any one or more of the following advantages over the prior art by applying control in the optical domain to "match" the operating wavelength and resonant cavity:

1) a simpler Fabry-Perot interferometer structure;
2) a faster control response;
3) a simpler control system (control of the operating wavelength is easier to implement than precise mechanical control of the initial cavity length);
4) a wider manufacturing tolerance;
5) a longer initial cavity length, and therefore a reduction of undesirable dynamic effects; and
6) an ability to use signal modulation techniques to overcome signal transmission impairments.

An embodiment of the present invention detects acoustic energy by detecting both the reflected and transmitted light from a Fabry-Perot interferometer. The ratio of the reflected and transmitted light is a function of the wavelength of the input light directed at the Fabry-Perot interferometer and the acoustic energy. A sensor signal, which is based on the difference between the reflected and transmitted light, is provided to a feed-back circuit that includes a low-pass filter and a laser wavelength controller. The laser wavelength controller controls the wavelength of the input light so as to drive low-frequency components (including a D.C. component) of the sensor signal to zero. As a result, only the audio frequency components due to acoustic energy incident on the Fabry-Perot interferometer are included in the output sensor signal.

Another embodiment of the present invention detects acoustic energy with high signal-to-noise-ratio by utilizing modulation techniques. In this embodiment, acoustic energy is detected by detecting both the reflected and transmitted light from a Fabry-Perot interferometer. The ratio of the reflected and transmitted light is a function of the wavelength of the input light directed at the Fabry-Perot interferometer and the acoustic energy. A laser wavelength controller is used to imprint an amplitude-modulation carrier wave on both the reflected and transmitted light from a Fabry-Perot interferometer. The carrier wave is imprinted on the reflected and transmitted light by applying a sinusoidally-varying wavelength control signal to the source. The carrier wave is modulated by a modulating signal that is based on the Fabry-Perot interferometer's response to incident acoustic energy. An output signal that is based only on the acoustic energy incident on the Fabry-Perot interferometer is recovered by demodulation of at least one of the detected signals that are based on the reflected beam and the transmitted beam.

An embodiment of the present invention comprises: a source of optical energy, wherein the optical energy has a wavelength, and wherein the wavelength is tunable over a range; a beam-splitter for receiving the optical energy and distributing the optical energy into an output that comprises at least one of a reflected beam and a transmitted beam, wherein the output is a function of the wavelength of the optical energy output by the source; wherein the beam-splitter is physically-adapted to imprint a first signal on the output, and wherein the first signal is based on an environmental stimulus

BRIEF DESCRIPTION OF THE DRAWINGS

FIG. 7 depicts a method for detecting an acoustic signal according to the illustrative embodiment of the present invention.

DETAILED DESCRIPTION

Some embodiments of the present invention incorporate subject matter disclosed in U.S. patent application Ser. No. 11/366,730, which is incorporated by reference herein.

The following terms are defined for use in this Specification, including the appended claims:

Fabry-Perot etalon means an optically-resonant cavity formed by two substantially parallel and substantially flat surfaces that are separated by a cavity length, wherein the cavity length is fixed.

Fabry-Perot interferometer means an optically-resonant cavity formed by two substantially parallel and substantially flat surfaces that are separated by a cavity length, wherein the cavity length is not fixed. Examples include arrangements of plates wherein the cavity length is controllably-varied using an actuator, as well as arrangements wherein the cavity length can vary in response to a stimulus, such as incident acoustic energy.

Cavity length means the instantaneous separation between two surfaces that form an optically-resonant cavity. Cavity length is fixed in the case of an etalon. Cavity length is variable in the case of an interferometer, such as a Fabry-Perot interferometer.

Reflected means reflected externally to an element. A beam reflected by an element, for example, undergoes a change in propagation direction, due to interaction with the element, of at least 90 degrees. It does NOT mean energy that reflects internally within the element. For example, reflected energy from an optically-resonant cavity means light reflected away from a surface of the cavity, not light reflecting between the two surfaces that form the cavity.

Transmitted means not reflected externally to or absorbed by an element. A transmitted beam undergoes a change in propagation direction of less than 90 degrees after interaction with the element. Examples of transmitted beams include, without limitation: a light beam that passes completely through a lens, dielectric layer, or material; a light beam that is refracted by a prism; and, light that passes through at least one surface that forms an optically-resonant cavity.

Reflective-surface means a surface that reflects a significant amount of optical energy at the wavelength or wavelengths suitable for an application.

Figure 1:
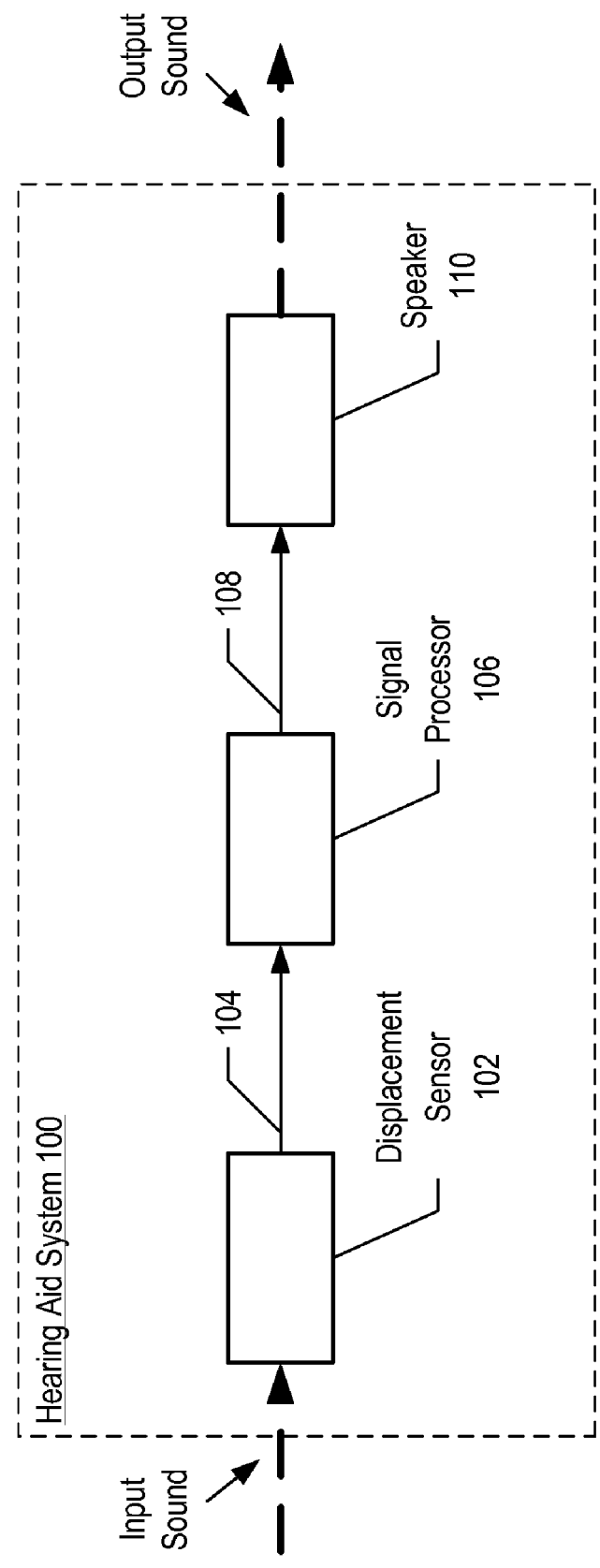
FIG. 1 depicts a schematic diagram of a hearing aid according to the illustrative embodiment of the present invention.

FIG. 1 depicts a schematic diagram of a hearing aid according to an illustrative embodiment of the present invention. Hearing aid system 100 comprises displacement sensor 102, signal processor 106, and speaker 110. Hearing aid system 100 receives input sound (i.e., acoustic energy), conditions the received sound, and provides output sound to the ear of a user.

Displacement sensor 102 is an optical microphone. It provides sensor signal 104 to signal processor 106, wherein the characteristics of sensor signal 104 are based on input sound received by displacement sensor 102. Displacement sensor 102 will be described in more detail below and with respect to FIG. 2.

Signal processor 106 is a processing system that receives sensor signal 104 and performs signal processing. Signal processor 106 comprises an analog-to-digital converter, a digital signal processor, and a digital-to-analog converter. Signal processor 106 provides electrical signal 108 to speaker 110, wherein electrical signal 108 is conditioned to provide:

i. enhanced signal strength; or
ii. improved signal clarity; or
iii. reduced signal noise; or
iv. providing a directionally-adapted signal; or
v. any combination of i, ii, iii, and iv.

In some embodiments of the present invention, signal processor comprises a fully-programmable gate array (FPGA) that facilitates execution of signal conditioning and software instructions. In some embodiments, signal processor comprises demodulation circuitry for demodulating a carrier signal from sensor signal 104.

Speaker 110 is an acoustic transducer for converting an electrical signal into acoustic energy in well-known fashion.

In some embodiments of the present invention, the function of signal processor 106 is incorporated into displacement sensor 102; therefore, a discrete signal processor, such as signal processor 106, is not included in these embodiments.

Figure 2:
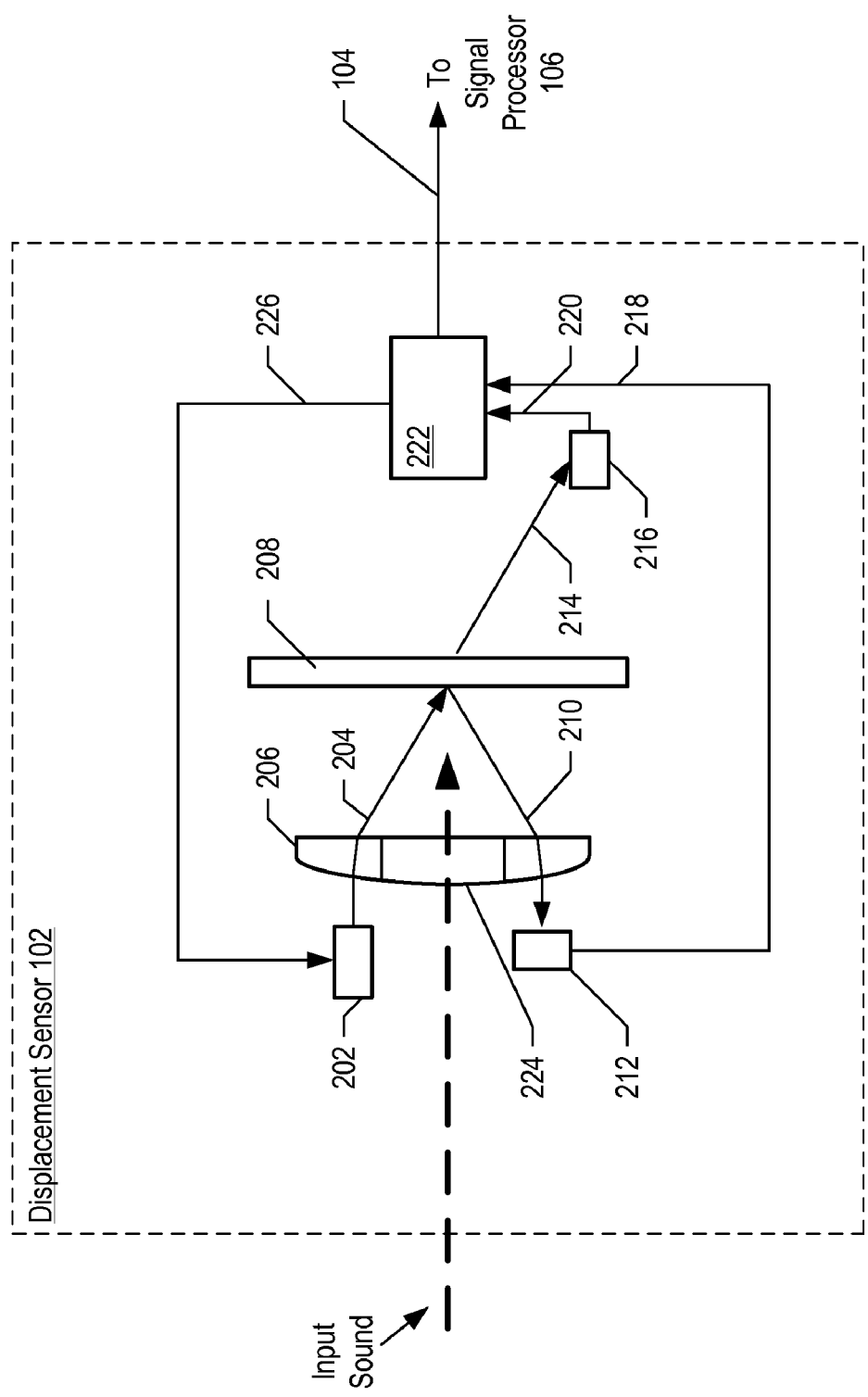
FIG. 2 depicts a schematic diagram of a displacement sensor according to the illustrative embodiment of the present invention.

FIG. 2 depicts a schematic diagram of a displacement sensor according to the illustrative embodiment of the present invention. Displacement sensor 102 comprises source 202, lens 206, Fabry-Perot interferometer 208, detector 212, detector 216, and processor 222. Displacement sensor 102 converts received acoustic energy into sensor signal 104 and provides sensor signal 104 to signal processor 106.

Source 202 comprises a variable current source and a vertical-cavity surface-emitting laser (VCSEL), which emits input beam 204. Input beam 204 is a beam of monochromatic light that includes the interferometer's operating wavelength, $\lambda_1$. The spectral-width of the monochromatic light is typically less than ten (10) nanometers, and preferably less than one (1) nanometer. Source 202 emits input beam 204 when the VCSEL is energized with an electric current. Source 202 is tunable over the range of 830 nanometers (nm) to 860 nm. Wavelength $\lambda_1$ is a function of the drive current provided to the VCSEL; therefore, $\lambda_1$ is controlled by controlling the drive current applied to source 202. In some embodiments of the present invention, the tunable range of source 202 is other than 830-860 nm.

In some embodiments of the present invention, source 202 comprises a tunable laser diode. In some other embodiments, source 202 comprises a light-emitting diode (LED) and a tunable narrow-pass-band optical filter. In yet further embodiments, source 202 comprises a super-luminescent light-emitting diode and a tunable narrow-pass-band optical filter. It will be clear to those skilled in the art, after reading this specification, how to make and use source 202.

In some embodiments of the present invention, source 202 also includes circuitry suitable for outputting a carrier wave (in an analog modulation approach) or baseband data signal (in a digital modulation approach). This carrier wave is then mixed with a modulating signal, which is based on an environmental stimulus that is incident on Fabry-Perot interferometer 208. It will be clear to those skilled in the art, after reading this specification, how to make and use embodiments of the present invention that utilize modulation techniques.

Lens 206 is a plano-convex lens that is suitable for collimating light emitted by source 202. Lens 206 includes access-hole 224, which facilitates the propagation of acoustic energy toward Fabry-Perot interferometer 208. In some embodiments, lens 206 does not include access-hole 224. Lens 206 is aligned to source 202 such that the output of source 202 is received off the central axis of lens 206. Lens 206 collimates the output of source 202 into input beam 204 and directs input beam 204 toward the focal point of lens 206. Lens 206 also receives reflected beam 210 from Fabry-Perot interferometer 208 and focuses the optical energy of reflected beam 210 toward detector 212. The configuration of lens 206, with respect to source 202, Fabry-Perot interferometer 208, and detector 212, is often referred to as a "pupil-division" configuration.

In some embodiments of the present invention, lens 206 is not present. In some embodiments, source 202 itself comprises a collimating lens and a non-orthogonal angle is formed by the direction of propagation of the output of source 202 and Fabry-Perot interferometer 208.

Fabry-Perot interferometer 208 is a variable-reflectivity optical element that comprises two partially-reflective surfaces that are physically separated from one another. The two surfaces define an optically-resonant cavity, which is characterized by a cavity length. Fabry-Perot interferometer 208 receives input beam 204 and splits it into reflected beam 210 and transmitted beam 214. The ratio of optical energy in reflected beam 210 and transmitted beam 214 is a function of the cavity length of Fabry-Perot interferometer 208, and the wavelength, $\lambda_1$, of input beam 204.

The cavity length of Fabry-Perot interferometer 208 is variable. In particular, one surface of Fabry-Perot interferometer 208 is located on a movable membrane that moves in response to receiving acoustic energy. The cavity length of Fabry-Perot interferometer 208 is, therefore, a function of the received acoustic energy. And, as a consequence, the ratio of optical energy in reflected beam 210 and transmitted beam 214 is a function of received acoustic energy.

Detectors 212 and 216 are photodetectors suitable for detecting the light output by source 202. Each of detectors 212 and 216 measure the intensity of the light that is incident on it and transmits an electrical signal indicative of that intensity to processor 222. Detector 212 receives reflected beam 210 and detector 216 receives transmitted beam 214. It will be clear to those skilled in the art, after reading this specification, how to make and use detectors 212 and 216.

Controller 222 is a general-purpose processor that is capable of reading data and instructions from a memory, of executing instructions, of writing data to a memory, of receiving data from detectors 212 and 216, and of providing sensor signal 104 to signal processor 106. Controller 222 receives electrical signals 218 and 220 and performs signal processing based on those signals.

Controller 222 also includes circuitry for providing feedback signal 226 to source 202 to control the wavelength of the light output by source 202. In some embodiments, controller 222 also includes circuitry suitable for causing source 202 to output a carrier wave (in an analog modulation approach) or baseband data signal (in a digital modulation approach). This carrier wave is then mixed with a modulating signal, which results from an environmental stimulus applied to Fabry-Perot interferometer 208. It will be clear to those skilled in the art, after reading this specification, how to make and use embodiments of the present invention that utilize modulation techniques.

In some embodiments of the present invention, processor 222 includes circuitry appropriate for the demodulation of signals 218 and/or 220. In some embodiments of the present invention, processor 222 comprises analog circuitry, such as a closed-loop feedback circuit, for reducing noise-derived contributions to sensor signal 104.

It will be clear to those skilled in the art, after reading this specification, how to make and use processor 222.

Although the present invention utilizes two detectors that detect both reflected beam 210 and transmitted beam 214, it will be clear to those skilled in the art, after reading this specification, how to make and use alternative embodiments of the present invention that utilize a single detector that detects only reflected beam 210 or transmitted beam 214.

Figure 3:
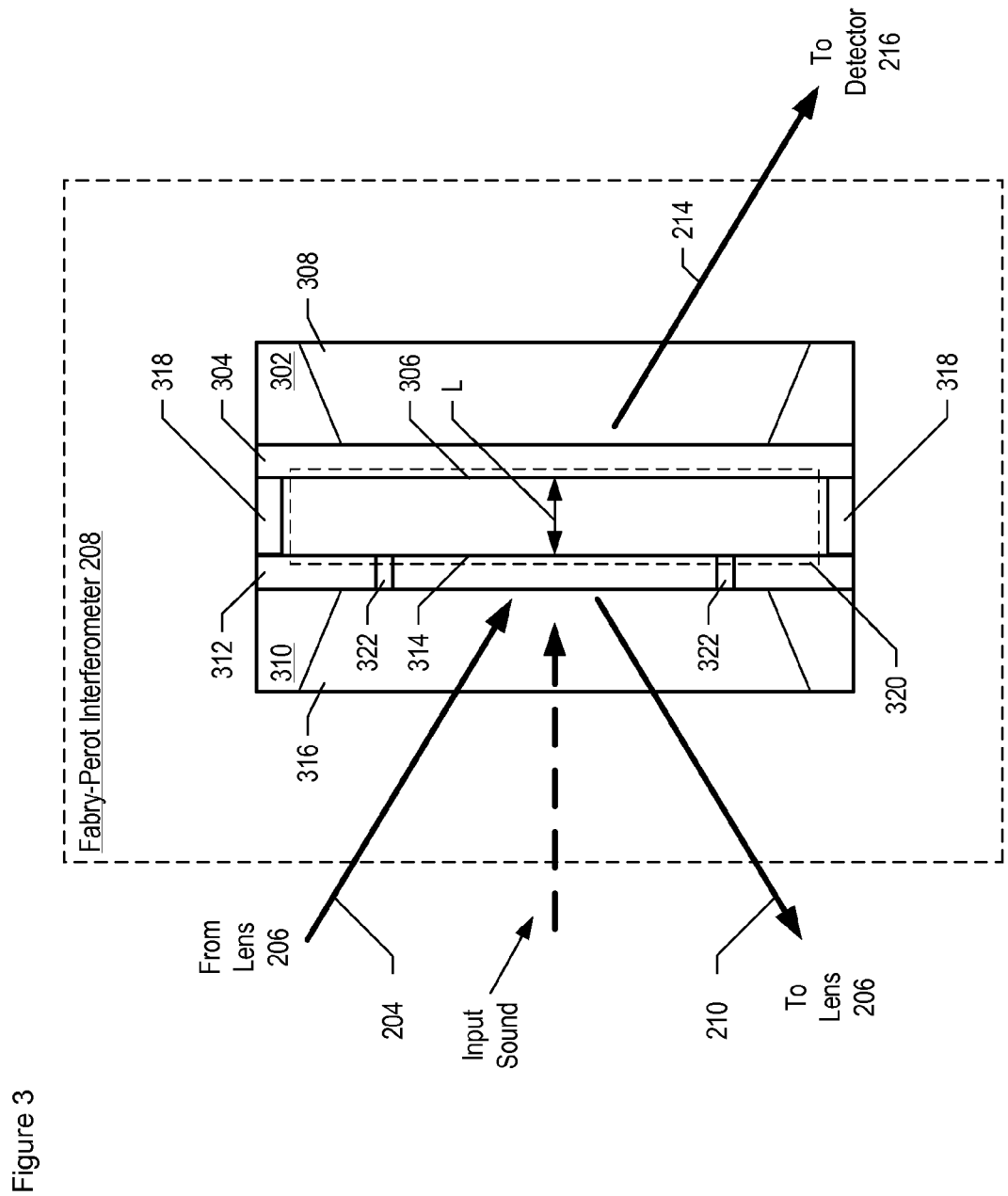
FIG. 3 depicts a cross-sectional view of a Fabry-Perot interferometer according to the illustrative embodiment of the present invention.

FIG. 3 depicts a cross-sectional view of a Fabry-Perot interferometer according to the illustrative embodiment of the present invention. Fabry-Perot interferometer 208 comprises substrate 302, layer 304, substrate 310, layer 312, and spacers 318. Optically-resonant cavity 320 is formed by a surface 306 of layer 304 and surface 314 of layer 312, which are separated by cavity length L. One or both of layers 304 and 312 are movable to vary the cavity length of cavity 320.

In operation, Fabry-Perot interferometer 208 receives input beam 204 from lens 206 and splits the optical energy of input beam 204 into reflected beam 210 and transmitted beam 214. The ratio of optical energy in reflected beam 210 and transmitted beam 214 is dependent upon the characteristics of optically-resonant cavity 320, as will be described below.

In the illustrative embodiment, substrate 302 is a silicon wafer that has a thickness of 500 microns. Substrate 302 provides a mechanical platform for layer 304. Substrate 302 comprises access-hole 308, which removes silicon from the path of light beam 214 in order to reduce absorption of optical energy by substrate 302. By virtue of access-hole 308, layer 304 is a movable membrane. In some embodiments of the present invention, substrate 302 has a thickness other than 500 microns and/or is a material other than silicon, such as, without limitation, glass, III-V compound semiconductors, II-VI compound semiconductors, ceramics, and germanium.

Layer 304 is a quarter-wave layer of material that is translucent at the operating wavelength of interferometer 208. More correctly, layer 304 has a thickness that is approximately $n\lambda_1/4$, where $\lambda_1$ is the operating wavelength within layer 304 and n is an odd-integer. Layer 304 includes surface 306, which is one of the surfaces of optically-resonant cavity 320. Layer 304 further includes through-holes 322, which enable Fabry-Perot interferometer 208 to adapt to changes in pressure (e.g., in order to provide or avoid mechanical damping effects, etc.).

In some embodiments of the present invention, layer 304 comprises silicon-rich silicon nitride (SiRN) and has a thickness of 100 nm. The thickness of layer 304 is selected to provide suitable performance of Fabry-Perot interferometer 208 at the wavelength of light provided by source 202.

It will be appreciated by those skilled in the art that the distribution of optical energy into the reflected beam and transmitted beam is dependent upon the thickness and index of refraction of each of layers 304 and 312. In some embodiments of the present invention, (e.g., wherein a different ratio of transmitted light to reflected light or different mechanical characteristics for layer 304 are desired) the thickness of layer 304 is approximately an even-order of $n\lambda/4$. That is, n is an even integer such that the thickness of the layer will be, for example, $\lambda_1/2$, $\lambda_1$, $3\lambda_1/2$, etc. In still some other embodiments of the present invention, the thickness of layer 304 is made different than any order of $n*\lambda_1/4$ in order to compensate for a deviation from normal incidence of input beam 204 at interferometer 208.

Substrate 310 provides a mechanical platform for layer 312. Substrate 310 comprises access-hole 316, which removes silicon from the path of light beam 206 in order to reduce absorption of optical energy by substrate 310. By virtue of access-hole 316, layer 312 is a movable membrane. In some embodiments of the present invention, substrate 310 is a material other than silicon, such as, without limitation, glass, III-V compound semiconductors, II-VI compound semiconductors, ceramics, and germanium. In some embodiments of the present invention, substrate 310 does not include access-hole 316. In some embodiments of the present invention, substrate 310 is not present. In some embodiments of the present invention, layer 312 and spacers 318 are disposed on substrate 302. In some embodiments of the present invention, layer 304 is not present and the optically-resonant cavity is formed by a surface of layer 312 and a surface of substrate 302.

Layer 312 is a layer of material that is translucent at the operating wavelength $\lambda_x$. Layer 312 comprises surface 314, which is one of the surfaces of optically-resonant cavity 320. In the illustrative embodiment of the present invention, layer 312 comprises a layer of SiRN having a thickness of 100 nm. The thickness of layer 312 is determined so as to enable the desired ratio of reflectivity to transmissivity for Fabry-Perot interferometer 208 for the wavelength of light provided by source 202. It will be appreciated by those skilled in the art that other thicknesses of layer 312 can be used, such as any odd-order of $n\lambda/4$, where n is an odd-integer (e.g., $3\lambda_1/4$, $5\lambda_1/4$, etc.). In some embodiments of the present invention, wherein it is desirable to substantially invert the ratio of reflectivity to transmissivity (from that of the illustrative embodiment), the thickness of layer 312 is approximately an order of $n\lambda_1/2$, where n is an integer (e.g., $\lambda_1/2$, $\lambda_1$, $3\lambda_1/2$, etc.). In still some other embodiments of the present invention, the thickness of layer 304 is made different than any order of $n*\lambda_1/4$ in order to compensate for a deviation from normal incidence of input beam 204 at interferometer 208.

Since, in some embodiments of the present invention, both reflected beam 206 and transmitted beam 214 are detected, greater tolerance to layer thickness variation is gained. In some embodiments of the present invention, therefore, the thicknesses of layers 304 and 312 can be substantially different than an even or odd order of $\lambda_1/4$. And, in some embodiments, the thickness of layer 304 is different than the thickness of layer 312.

In some embodiments of the present invention, at least one of layers 304 and 312 comprises a material other than SiRN. In still some other embodiments of the present invention, at least one of layers 304 and 312 comprises a plurality of layers of different materials. Suitable materials for use in layers 304 and 312 include, without limitation, silicon, silicon dioxide, silicon oxide (SiOx, where x is in the range of 0.1 to 4), titanium nitride, polysilicon, stoichiometric silicon nitride ($Si_3N_4$), III-V compound semiconductors, and II-VI compound semiconductors. In still some other embodiments of the present invention, the thickness of at least one of layers 304 and 312 is other than an even or odd order of $\lambda/4$.

Spacers 318 are precision ceramic spacers that have a thickness of approximately 110 microns. The thickness of spacers 318 is determined so as to provide suitable performance of Fabry-Perot interferometer 208 for the wavelength of light provided by source 202. In some embodiments of the present invention, spacers 318 comprise silicon, and are formed by etching away a silicon wafer that is disposed between layers 304 and 312. In still some other embodiments, spacers 318 comprise a material other than ceramic or silicon such as, without limitation, metals, epoxies, solder, silicon dioxide, glass, alumina, III-V compound semiconductors, and II-VI compound semiconductors. Although the illustrative embodiment comprises spacers that have a thickness of approximately 110 microns, it will be clear to those skilled in the art, after reading this specification, how to make and use alternative embodiments of the present invention that comprises spacers that have a thickness of other than 110 microns.

Optically-resonant cavity 320 comprises surface 306 and surface 314, which are separated by cavity-length L. In the absence of a pressure differential across the thickness of either layer 304 or 312, cavity-length L is equal to $L_0$, and $L_0$ is equal to the thickness of spacer 318. In the presence of a pressure differential across its thickness (e.g., due to incident acoustic energy), however, the movable membrane portion of layer 304 moves and cavity length L is changed.

As discussed in the background, it is often necessary to achieve a specific relationship between the cavity length of an interferometer and the wavelength of light with which it's operated. Fabry-Perot interferometers known in the prior art have relied upon the use of an actuator to "tune" the initial cavity length to the wavelength of light used. An electrostatic actuator is commonly used for this purpose. The use of an actuator to control initial cavity length, however, can lead to limitations on the design and performance of a Fabry-Perot interferometer.

In contrast to the prior art, the illustrative embodiment of the present invention adjusts $\lambda_1$ to achieve a desired relationship with initial cavity length, $L_0$. Control of $\lambda_1$ is much easier to implement than control of $L_0$. In addition, the use of an all-optical technique avoids the mechanical damping and noise pressure problems associated with prior art devices. The relationship between cavity length and $\lambda_1$ is discussed below and with reference to FIGS. 4 and 5.

Figure 4:
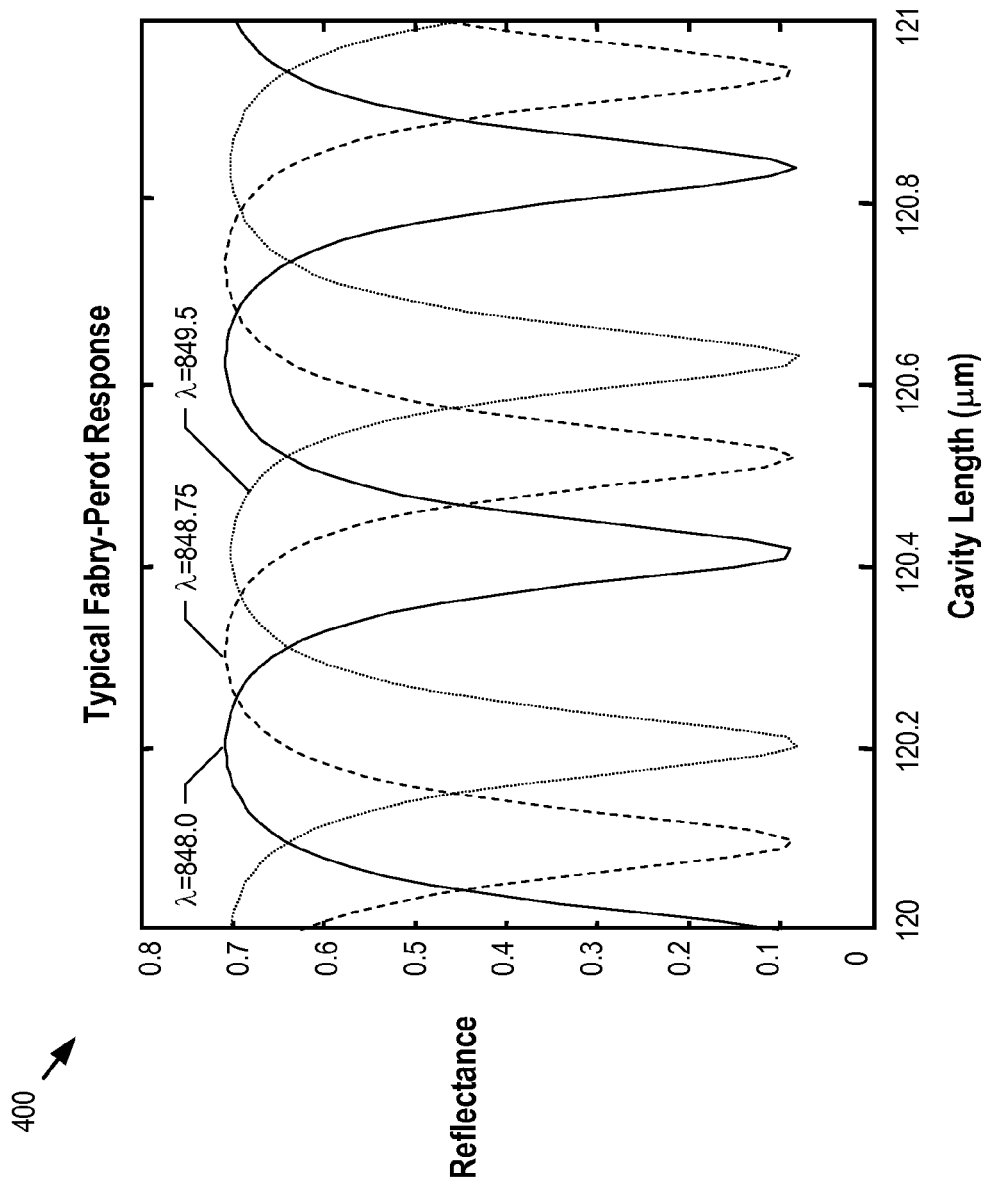
FIG. 4 depicts a plot of the reflectance of a Fabry-Perot cavity with respect to cavity length and wavelength.

FIG. 4 depicts a plot of the reflectance of a Fabry-Perot cavity with respect to cavity length and wavelength. Reflectance is plotted for three different wavelengths, λ=848 nm, λ=848.75 nm, and λ=849.5 nm for a cavity length range from 120 microns to 121 microns. As can be seen from these plots, an effective cavity length change of more than 0.2 microns (i.e., 200 nm) is induced by a wavelength shift of only 1.5 nm.

As can be observed in the plots shown in FIG. 4, a sinusoidal variation of $\lambda_1$ can be used to vary the reflectivity of a Fabry-Perot interferometer in sinusoidal fashion. This technique is used in the alternative embodiment described below and with reference to FIGS. 6B and 8.

Figure 5:
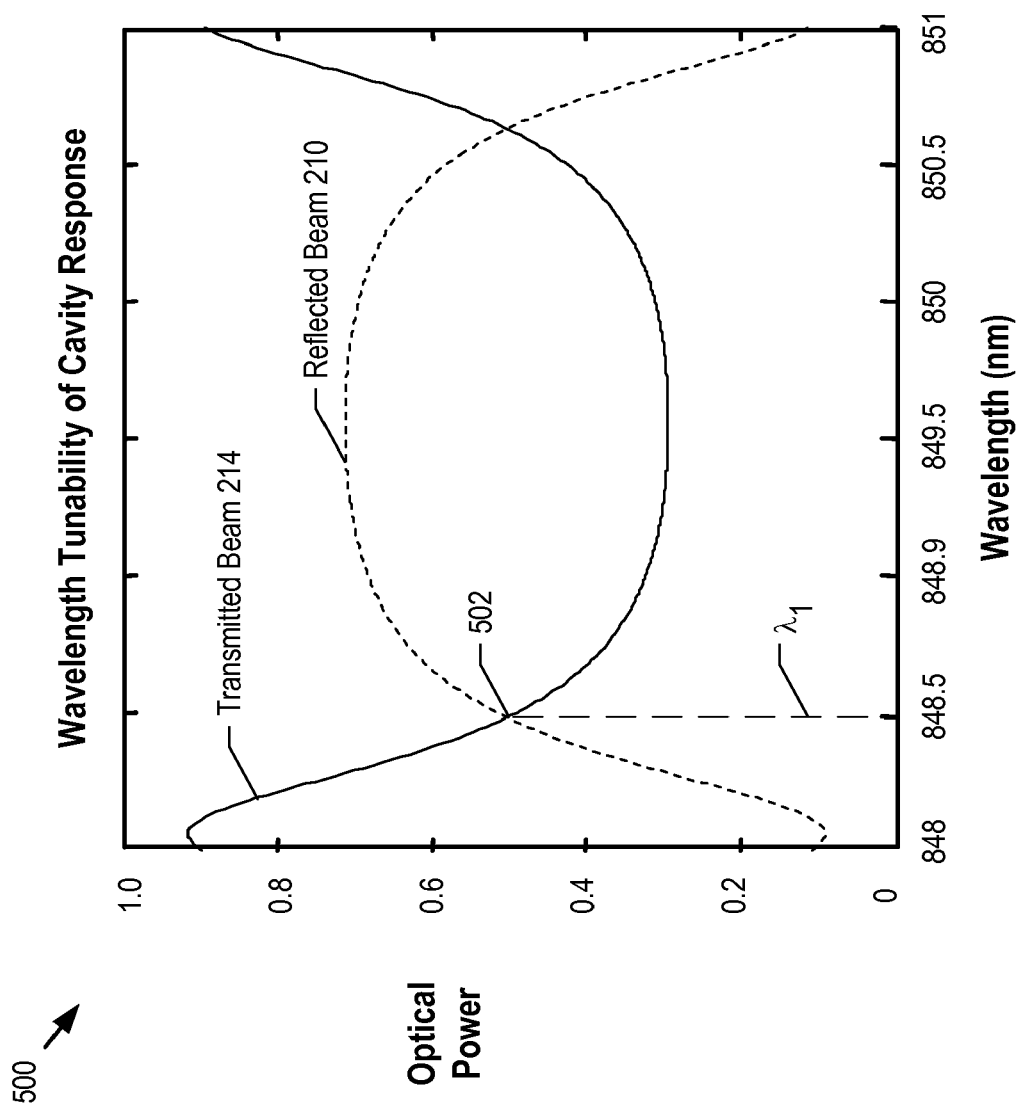
FIG. 5 depicts a plot of the optical power distribution in reflected beam 210 and transmitted beam 214, according to the illustrative embodiment of the present invention.

FIG. 5 depicts a plot of the optical power distribution in reflected beam 210 and transmitted beam 214, according to the illustrative embodiment of the present invention. The optical power distribution is plotted as a function of wavelength for a fixed cavity length. One full cycle of optical power distribution between transmitted beam 214 and reflected beam 210 is affected with a wavelength shift of only 3 nm (i.e., from 848 nm to 851 nm). The plot shown in FIG. 5 was taken in the absence of an environmental stimulus.

The wavelength of input beam 204 can be controlled to set the intensity of reflected beam 210 and transmitted beam 214 to any value on the plots. This is often referred to as setting the "operating point" of the system. In the illustrative embodiment, operating point 502 is the point where the optical power of input beam 204 is distributed equally into reflected beams 210 and 214. Operating point 502 is set by controlling the wavelength of input beam 202, $\lambda_1$, to be 848.5 nm. Choosing the operating point 502 as shown permits the full dynamic range of the acoustic response of Fabry-Perot 208 to be utilized.

Microphone Operation Using Feedback Control

Figure 6A:
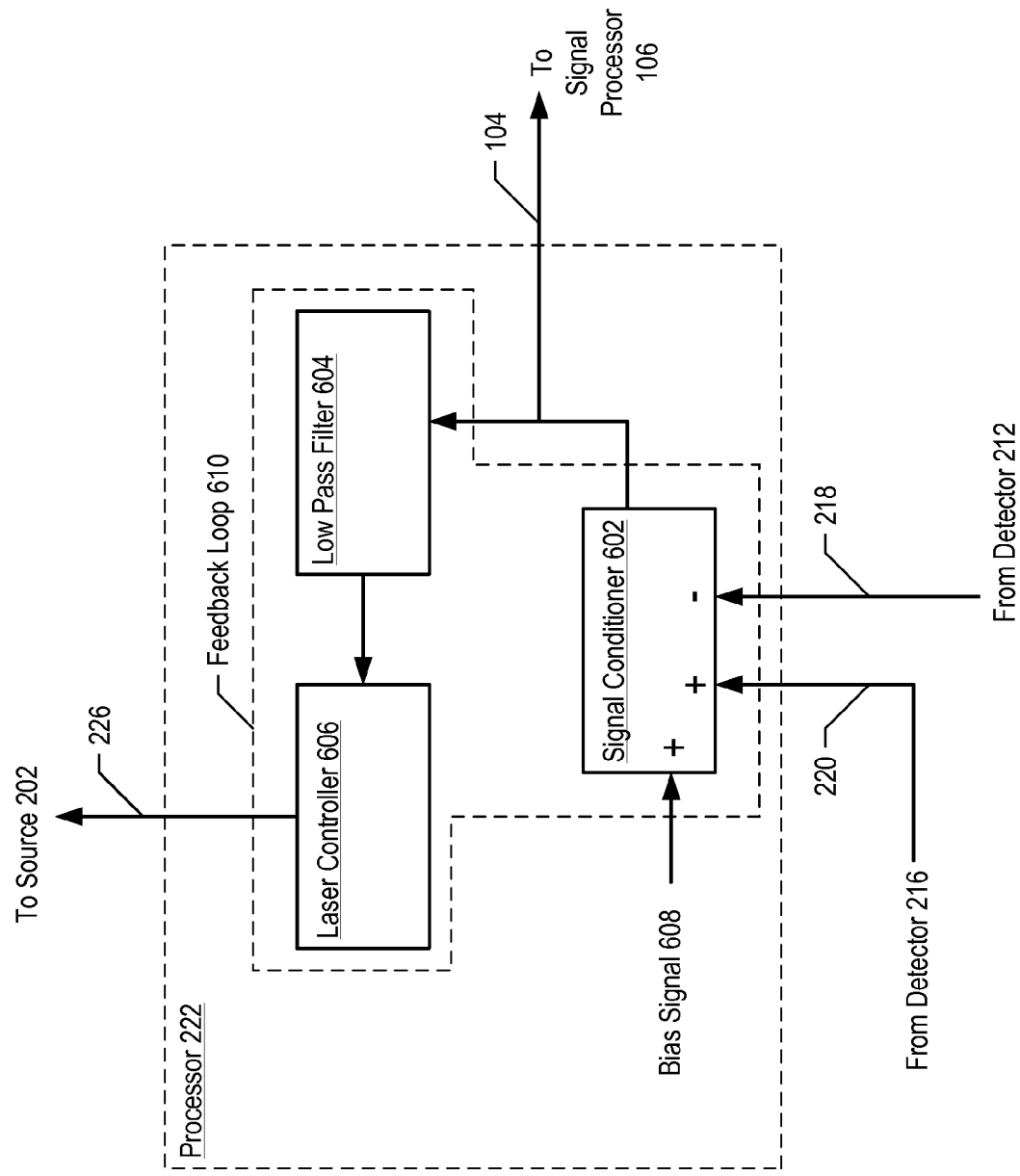
FIG. 6A depicts a cross-sectional view of a processor according to the illustrative embodiment of the present invention.

FIG. 6A depicts a cross-sectional view of a processor according to the illustrative embodiment of the present invention. Processor 222 comprises signal conditioner 602, low-pass filter 604, and laser controller 606. Processor 222 receives electrical signals 218 and 220 from detectors 212 and 216, respectively, and provides sensor signal 104 to signal processor 106. In addition, processor 222 controls the wavelength of the light output by source 202 by providing source 202 with feedback signal 226. Feedback signal 226 is provided to source 202 through feedback loop 610, which comprises signal conditioner 602, low-pass filter 604, and laser controller 606. Feedback loop 610 controls operating wavelength $\lambda_1$ to substantially drive low-frequency components contained of sensor signal 104 to zero. As a result, the distribution of optical energy in reflected beam 210 and transmitted beam 214 is equalized as for operating point 502 as described above and with respect to FIG. 5.

Signal conditioner 602 is an electrical circuit that includes a differential amplifier for generating an electrical signal based on the difference between electrical signals 218 and 220. Signal conditioner 602 is a part of feedback loop 610 described above, and also provides sensor signal 104 to signal processor 106. Signal conditioner 602 optionally includes an input for receiving bias signal 608. Bias signal 608 compensates for a fixed offset caused by any asymmetries in detectors 212 and 216. Bias signal 608 enables displacement sensor 102 to be operated at the point of highest sensitivity.

In some embodiments, signal conditioner 602 includes an analog-to-digital converter and/or a digital-to-analog converter. It will be clear to one skilled in the art, after reading this specification, how to make and use signal conditioner 602.

Low-pass filter 604 is an electrical circuit for filtering out frequencies above a cutoff frequency and passing only those frequencies below a cut-off frequency to laser controller 606. The cutoff frequency for low-pass filter 604 is chosen to be a frequency lower than the minimum frequency component contained in the acoustic energy incident upon Fabry-Perot interferometer 208. For example, the voice frequency band contains frequency components from about 300 Hertz (Hz) to about 3000 Hz; therefore the cut-off frequency of low-pass filter for use in voice applications would need to be below 300 Hz. The audio frequency band contains frequency components from about 20 Hz to about 20,000 Hz; therefore the cut-off frequency of low pass filter for use in audio applications would need to be below 20 Hz. It will be clear to those skilled in the art, after reading this specification, how to make and use low-pass filter 604.

Laser controller 606 is an electrical circuit that controls the wavelength of source 202, in well-known fashion. Laser controller 606 receives an input signal from low-pass filter 604 and provides a drive current to source 202.

Processor 222 receives the output of detectors 212 and 216 (i.e., electrical signals 218 and 220, respectively) and provides sensor signal 104 to signal processor 106. Sensor signal 104 only contains the audio frequency components imprinted on electrical signals 218 and 220 by Fabry-Perot interferometer 208. Any other frequency components, including D.C. levels, are substantially stripped from sensor signal 104 by virtue of feedback loop 610.

In order to more clearly demonstrate the present invention, the illustrative embodiment depicted in FIG. 6A is described here in operation as a microphone, with reference to FIGS. 2, 3, 6A and 7.

As depicted in FIG. 7, at operation 701, source 202 generates input signal 204, which includes wavelength $\lambda_1$ ($\lambda_1$ is typically the center wavelength of signal 204).

At operation 702, input signal 204 is distributed into reflected beam 210 and transmitted beam 214 by Fabry-Perot interferometer 208.

At operation 703, acoustic energy that is incident on Fabry-Perot interferometer 208 causes it to imprint an acoustic signal on reflected beam 210 and transmitted beam 214.

At operation 704, sensor signal 104 is generated as a function of the difference between the intensities of reflected beam 210 and transmitted beam 214.

At operation 705, sensor signal 104 is passed through low-pass filter 604 to laser controller 606. Low pass filter 604 removes the frequency components above its cut-off frequency (i.e., the frequency components due to the acoustic energy incident on Fabry-Perot interferometer 208). Laser controller 606 controls the wavelength of source 202 so as to drive the low-frequency signal provided by low-pass filter 604 to zero. As a result, sensor signal 104 contains only frequency components that are above the cut-off frequency of low-pass filter 604 (i.e., only the audio frequency components due to the acoustic energy incident on Fabry-Perot interferometer 208).

At operation 706, sensor signal 104 is provided to signal processor 106.

In some embodiments of the present invention, the operating point for displacement sensor 102 is set to a specific value by adjusting and fixing $\lambda_1$ in the absence of acoustic energy. In some embodiments, the operating point is selected such that it does not result in equal distribution of optical power in reflected beam 210 and transmitted beam 214. In some other embodiments, source 202 provides a plurality of independent wavelengths. In these embodiments, detectors 212 and 216 comprise multiple detecting regions. Each of these detecting regions includes a wavelength filter to restrict each detecting region's operability to only one of the plurality of wavelengths provided by source 202.

Microphone Operation Using Signal Modulation

Figure 6B:
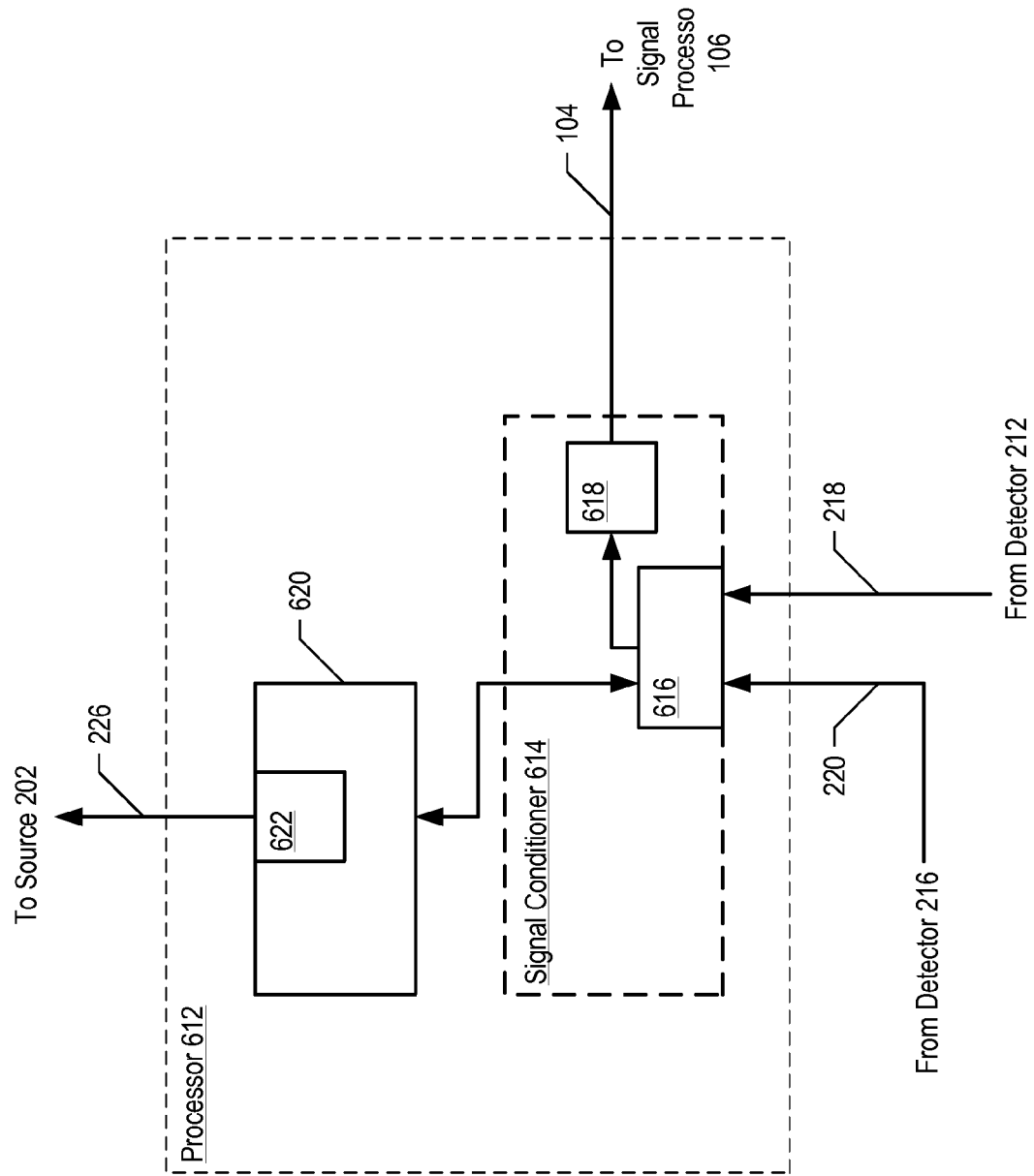
FIG. 6B depicts a cross-sectional view of a processor according to an alternative embodiment of the present invention.

FIG. 6B depicts processor 612 according to an alternative embodiment of the present invention. Processor 612 comprises signal conditioner 614 and laser controller 620. Signal conditioner 614 comprises demodulator 616 and differential amplifier 618. Laser controller 620 comprises modulator 622.

Differential amplifier 618 provides sensor signal 104, which is based on the difference between demodulated electrical signals 218 and 220, in well-known fashion.

Demodulator 616 is a demodulation circuit for recovering, from electrical signals 218 and 220, signals that are based only on the acoustic energy that is incident on Fabry-Perot interferometer 208.

Modulator 622 is an analog modulation circuit for imprinting a carrier wave on input beam 204 in well-known fashion.

Demodulator 616 operates in concert with modulator 622, which is included in laser controller 620. Modulator 622 imprints a carrier wave on input signal 204, and demodulator 616 removes the carrier wave from electrical signals 218 and 220. In some embodiments modulator 622 is included in source 202, rather than in laser controller 620.

In the alternative embodiment depicted in FIG. 6B, the acoustic signal is modulated to overcome signal transmission issues. This enables lower-loss transmission of the acoustic signal as contained in input beam 204, reflected beam 210 and transmitted beam 214. In some embodiments, demodulator 616 and modulator 622 provide an analog modulation scheme wherein a carrier wave is imprinted on input beam 204. In some other embodiments, demodulator 616 and modulator 622 provide a digital modulation scheme wherein a baseband data signal is imprinted on input beam 204. Modulation techniques suitable for use in the present invention include, without limitation, amplitude modulation, frequency modulation, phase modulation, sigma-delta modulation, phase-shift keying, frequency-shift keying, audio frequency-shift keying, amplitude-shift keying, quadrature amplitude modulation, continuous phase modulation, and trellis coded modulation. It will be clear to those skilled in the art, after reading this specification, how to make and use demodulator 616 and modulator 622.

In order to more clearly demonstrate the present invention, the alternative embodiment depicted in FIG. 6B is described here in operation as a microphone, with reference to FIGS. 2, 3, 6B and 8.

Figure 8:
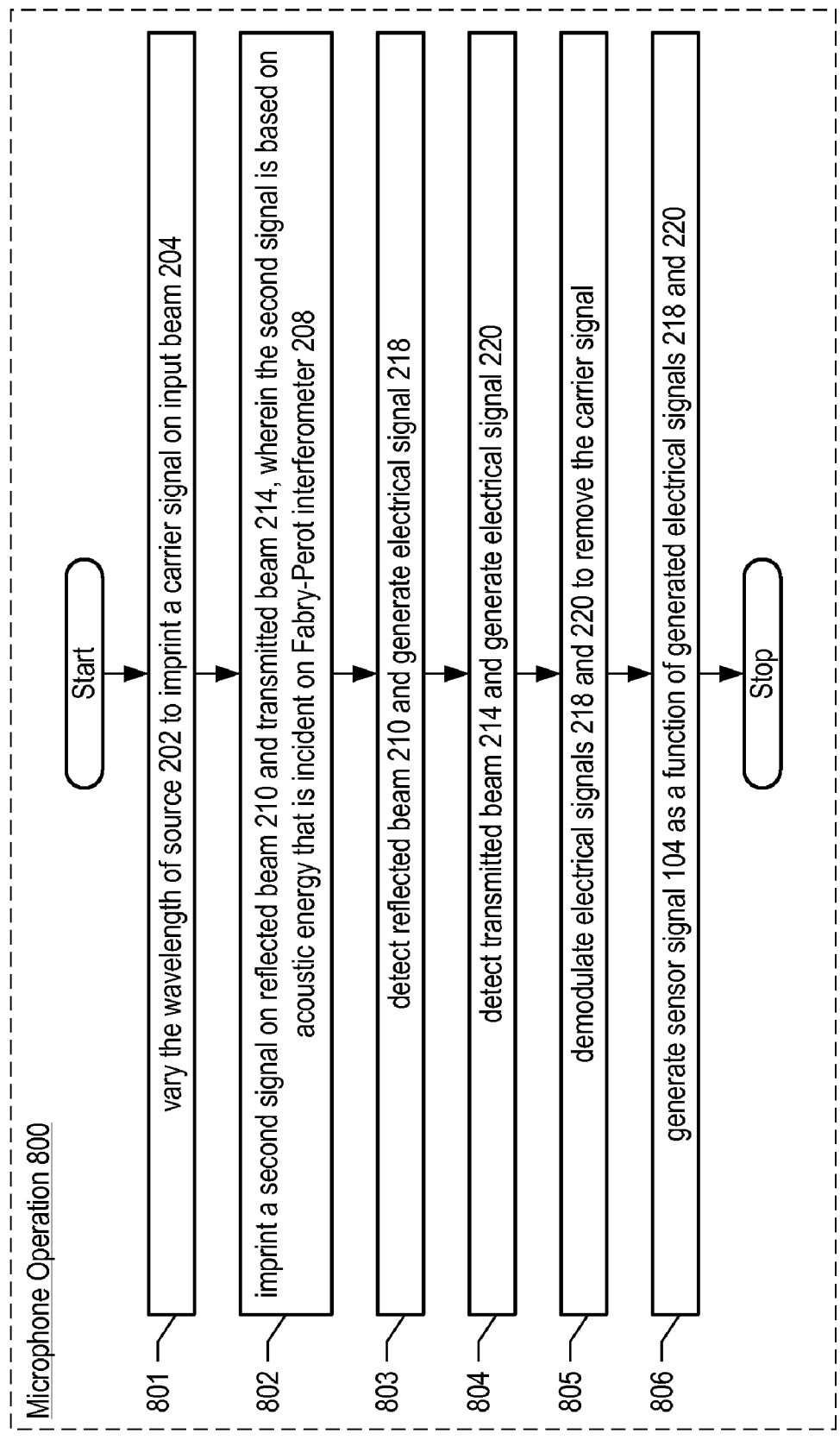
FIG. 8 depicts a method for detecting an acoustic signal according to an alternative embodiment of the present invention.

As depicted in FIG. 8, at operation 801 the wavelength of the light output by source 202 is varied to imprint a sinusoidal amplitude signal on reflected beam 210 and transmitted beam 214. This imprinted signal acts as a carrier wave for a modulating signal imprinted by Fabry-Perot interferometer 208. The modulating signal is based on acoustic energy incident on Fabry-Perot interferometer 208.

At operation 802, acoustic energy incident on layer 312 causes Fabry-Perot interferometer 208 to imprint the modulating signal on the carrier wave generated in operation 801.

At operation 803, detector 212 generates electrical signal 218 based on the intensity of reflected beam 210.

At operation 804, detector 216 generates electrical signal 220 based on the intensity of transmitted beam 214.

At operation 805, electrical signals 218 and 220 are demodulated to recover only the audio frequency components due to the acoustic energy incident on Fabry-Perot interferometer 208.

At operation 806, sensor signal 104 is generated and provided to signal processor 106. Sensor signal 104 is a function of the difference between the audio frequency components on electrical signals 218 and 220.

Microphone Operation Using a Wideband Wavelength Controller

Figure 6C:
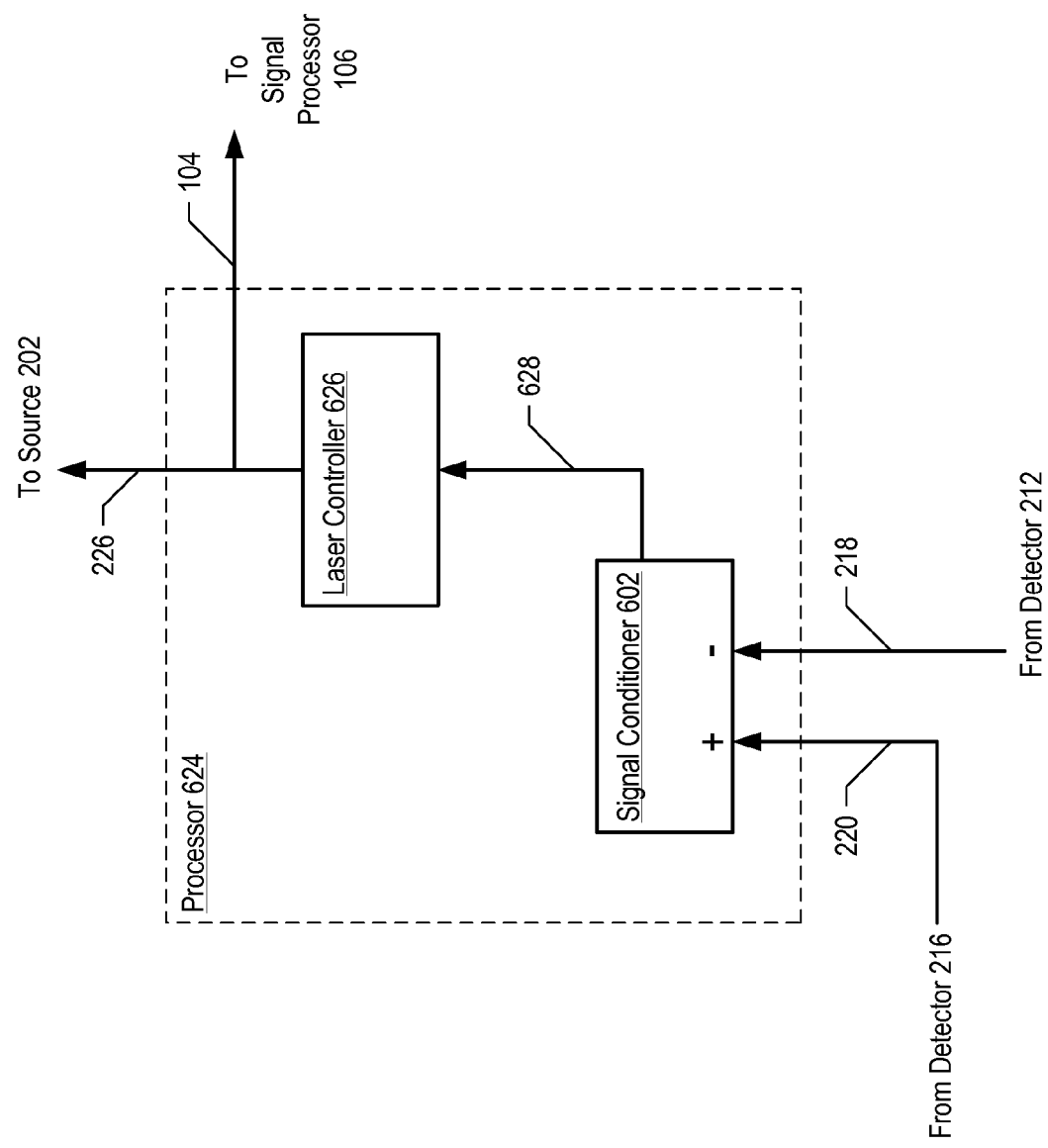
FIG. 6C depicts a cross-sectional view of a processor according to another alternative embodiment of the present invention.

FIG. 6C depicts a cross-sectional view of the salient components of a processor according to another alternative embodiment of the present invention. Processor 624 comprises signal conditioner 602 and laser controller 626.

Laser controller 626 is a wideband wavelength controller as is known to those skilled in the art. Laser controller 626 receives electrical signal 628 from signal conditioner 602. Electrical signal 628 is a signal based on the difference between electrical signals 218 and 220. Laser controller 626 provides feedback signal 226 to source 202. Laser controller 626 controls the wavelength of the output of source 202 so as to drive electrical signal 628 to zero. In the embodiment depicted in FIG. 6C, sensor signal 104 is feedback signal 226, which is the output of laser controller 626, Sensor signal 104 is provided to signal processor 106 as the output of displacement sensor 102. The use of a wideband wavelength controller and the use of feedback signal 226 as the output of displacement sensor 102 make it possible to extend the dynamic range of displacement sensor 102.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method for detecting an environmental stimulus comprising:
    distributing optical energy having a first wavelength into a reflected beam and a transmitted beam by controlling said first wavelength as a function of a cavity length wherein:
        (i) said reflected beam is a first function of said first wavelength; and
        (ii) said transmitted beam is a second function of said first wavelength; and
    imprinting a first signal on said reflected beam and said transmitted beam, wherein said first signal is based on said environmental stimulus.

2. The method of claim 1 wherein first signal is characterized by a minimum frequency, and wherein said first wavelength is controlled to set the intensity of at least one of said reflected beam and said transmitted beam to an operating point at a frequency that is less than said minimum frequency.

3. The method of claim 1 wherein first signal is characterized by a minimum frequency, and wherein said first wavelength is controlled to substantially equalize the intensity of said reflected beam and the intensity of said transmitted beam at a frequency below said minimum frequency.

4. The method of claim 1 wherein said first wavelength is controlled to substantially equalize the intensity of said reflected beam and the intensity of said transmitted beam at a frequency that is less than or equal to 10 Hertz.

5. The method of claim 1 wherein said first signal is imprinted on said first intensity and said second intensity by a Fabry-Perot interferometer that is physically-adapted to have a cavity length that is sensitive to said environmental stimulus.

6. The method of claim 1 further comprising generating an output signal, wherein said output signal is based on at least one of said first intensity and said second intensity.

7. The method of claim 1 wherein said optical energy comprises a second wavelength, and wherein said method further comprises:
    generating a first output signal, wherein said first output signal is based on at least one of said first intensity and said second intensity, and wherein said first output signal is based on said first wavelength;
    generating a second output signal, wherein said second output signal is based on at least one of said first intensity and said second intensity, and wherein said second output signal is based on said second wavelength.

8. A method for detecting an environmental stimulus comprising:
    receiving optical energy having a first wavelength;
    distributing said optical energy into a reflected beam and a transmitted beam wherein:
        (i) said reflected beam is a first function of said first wavelength; and
        (ii) said transmitted beam is a second function of said first wavelength; and
    controlling said first wavelength to imprint a carrier signal on said reflected beam and said transmitted beam; and
    imprinting a first signal on said reflected beam and said transmitted beam, wherein said first signal is based on said environmental stimulus.

9. The method of claim 8 wherein said first signal is based on the responsivity of a Fabry-Perot interferometer that is physically adapted to have a cavity length that is sensitive to said environmental stimulus.

10. The method of claim 8 wherein said carrier signal and said first signal compose a modulated signal.

11. The method of claim 10 wherein said modulated signal is an analog-modulated signal.

12. The method of claim 10 wherein said modulated signal is a digital-modulated signal.

13. The method of claim 10 further comprising:
    generating an output signal, wherein said output signal is based on the intensity of at least one of said reflected beam and said transmitted beam; and
    demodulating said output signal.

* * * * *